Jan. 21, 1964   P. DI LELLA   3,118,254
GRINDING MACHINE
Filed March 22, 1961   12 Sheets-Sheet 2

INVENTOR:
PAUL DiLELLA,
BY D. Emmett Thompson
HIS ATTORNEY.

INVENTOR:
PAUL DiLELLA,
BY D. Emmett Thompson
HIS ATTORNEY.

Jan. 21, 1964      P. DI LELLA      3,118,254

GRINDING MACHINE

Filed March 22, 1961      12 Sheets-Sheet 6

INVENTOR:
PAUL DiLELLA,
BY D. Emmett Thompson
HIS ATTORNEY.

Jan. 21, 1964  P. DI LELLA  3,118,254
GRINDING MACHINE
Filed March 22, 1961  12 Sheets-Sheet 7
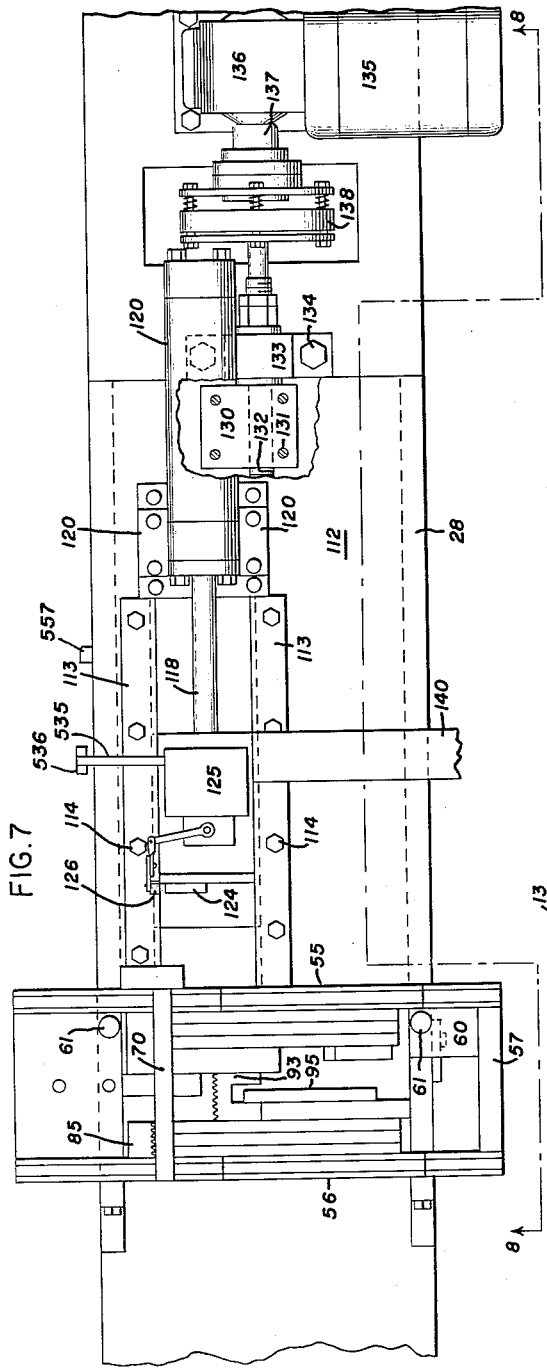
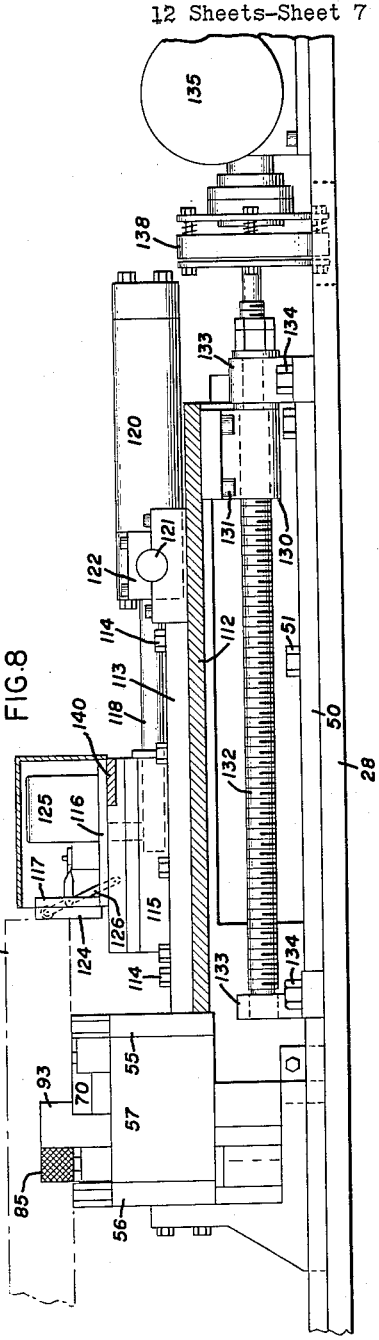
INVENTOR:
PAUL DiLELLA,
BY D. Emmett Thompson
HIS ATTORNEY.

INVENTOR:
PAUL DiLELLA,
BY D. Emmett Thompson
HIS ATTORNEY.

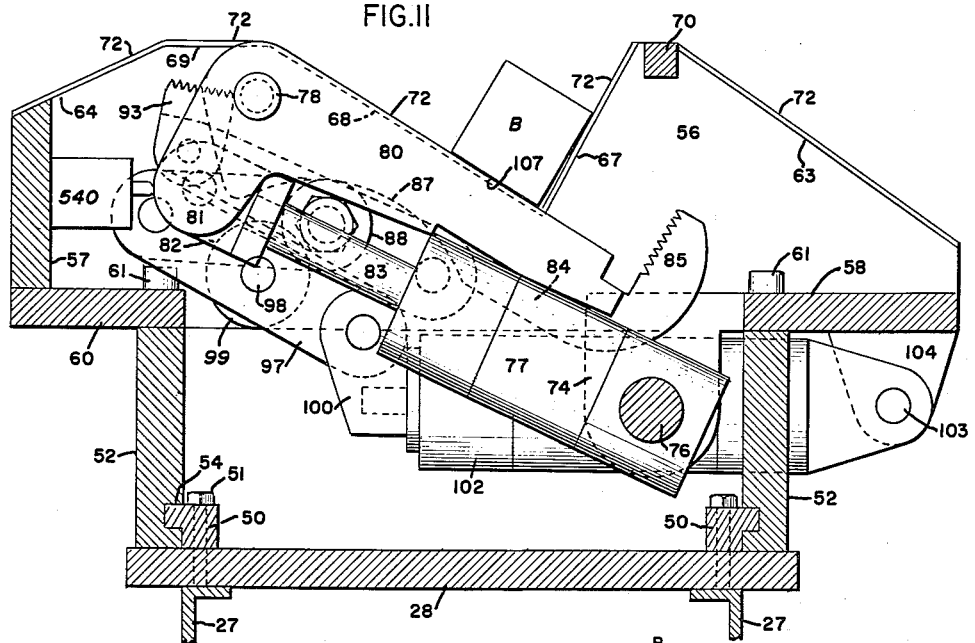
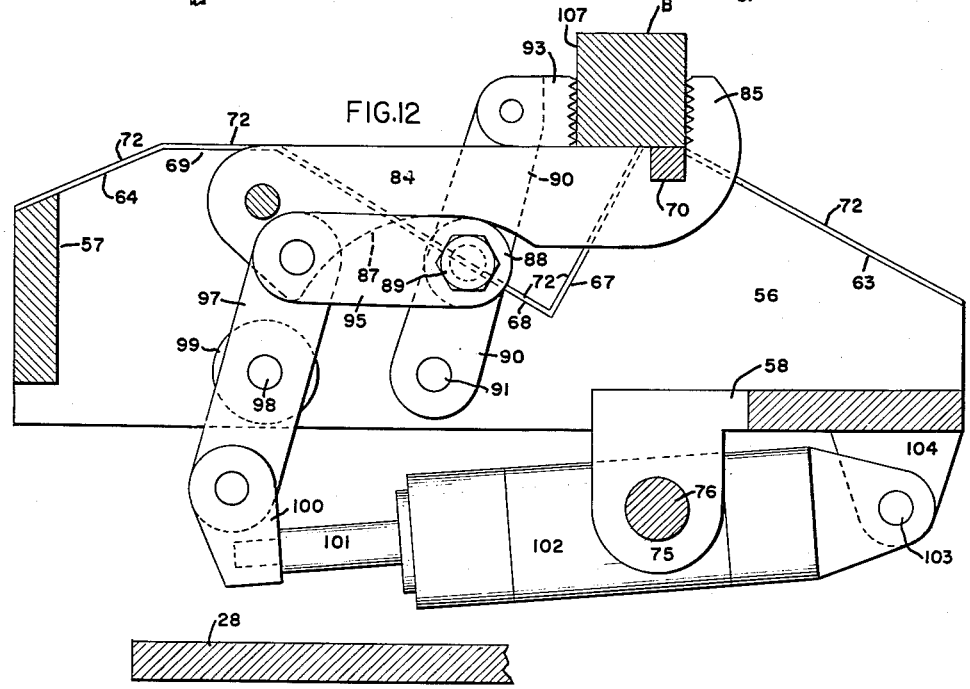

Jan. 21, 1964    P. DI LELLA    3,118,254
GRINDING MACHINE
Filed March 22, 1961    12 Sheets-Sheet 12
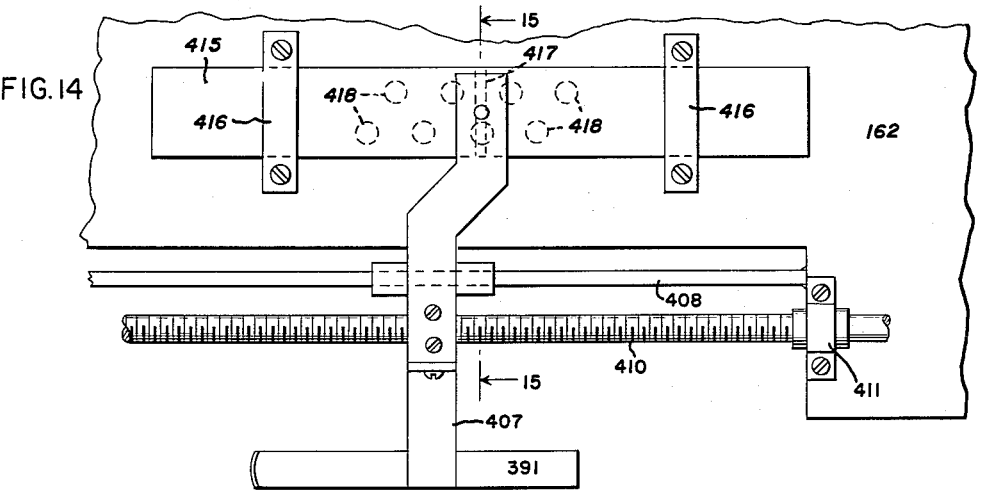
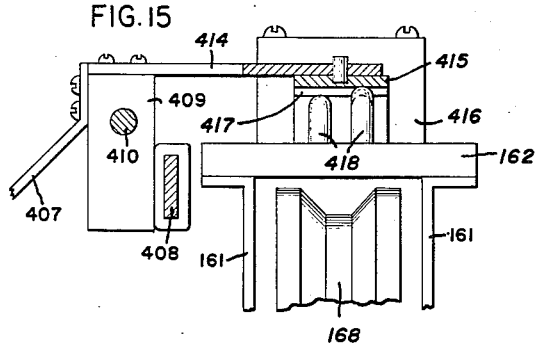
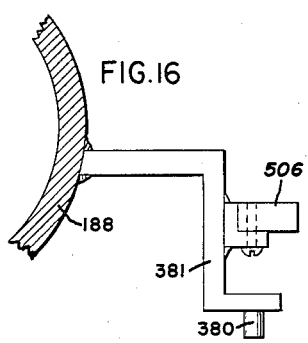
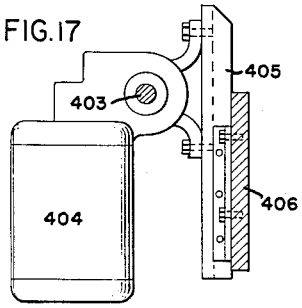
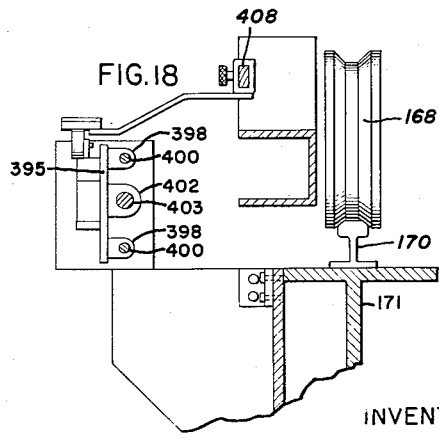
INVENTOR:
PAUL DiLELLA,
BY D. Emmett Thompson
HIS ATTORNEY.

United States Patent Office 3,118,254
Patented Jan. 21, 1964

3,118,254
GRINDING MACHINE
Paul Di Lella, Solvay, N.Y., assignor, by mesne assignments, to E. W. Bliss Company, Canton, Ohio, a corporation of Delaware
Filed Mar. 22, 1961, Ser. No. 97,562
8 Claims. (Cl. 51—45)

This invention relates to an improved grinding machine for grinding the sides of multi-sided work pieces automatically, and removing a uniform thickness of material from the work piece. The invention is illustrated herein as a grinding machine intended particularly for grinding steel billets.

In the manufacture of alloy and tool steel, the molten steel is poured into a mould to cast an ingot, containing usually a number of tons of steel. This ingot is heated and passed through a roll mill to effect elongation of the billet and to reduce its cross sectional dimension in the order of from two to six inches. This elongated piece is cut into lengths approximately six feet long, and the pieces are referred to as billets. These billets are again re-heated and then rolled or drawn down to a desired cross sectional dimension for the formation of cutters, tools, etc. Because of rolling the large ingot under extremely high pressure, the billets are covered with a skin of scale, and also the high pressure rolling develops flaws in the billet in the form of checks and cracks.

Before the billets can be re-rolled, it is necessary to remove this scale and any such flaws that may exist. Heretofore, the billets have been ground to remove the scale and flaws by manual manipulation of a free suspended grinder. This embodied a great deal of manual labor and a considerable waste of steel, in that the removal of the scale was according to the judgment of the operator of the manually manipulated grinder.

More recently, machines have been developed for automatically grinding billets and with the aim of removing a uniform thickness of material. These machines have not functioned satisfactory due to the fact that the structural arrangement involved and the control mechanism did not function to maintain, within close limits, a uniform pressure between the grinding wheel and the billet. Without proper control this pressure necessarily varies, due to the fact that the billets are invariably not straight, but more often warped, bent, or otherwise of crooked form whereby, to remove a uniform thickness of material, the arrangement has to be such that a uniform preset pressure will be maintained while the grinding wheel is following the contour of the billet. The prior machines, lacking this close control, accordingly did not properly grind the billets and also caused a waste of steel.

This invention has as an object a grinding machine embodying a structural arrangement and control mechanism by which the machine can be set to remove any desired uniform thickness of material from the sides of the billet, this being accomplished by adjusting the machine to establish a preset pressure between the grinding wheel and the surface of the billet being ground, and that pressure will be maintained automatically, within exceedingly close limits, regardless of the contour of the billet.

The invention has as a further object a grinding machine of the type referred to capable of being quickly and conveniently adjusted by a single means to establish a predetermined pressure between the wheel and the work piece.

The invention has a further object an improved mechanism for clamping the billets to the reciprocating table, and for automatically turning the billets to present the sides of the billets successively to the grinding wheel.

The invention consists in the novel features and in the combinations and constructions hereinafter set forth and claimed.

In describing this invention, reference is had to the accompanying drawings in which like characters designate corresponding parts in all the views.

In the drawings:

FIGURE 7 is an enlarged top plan view of one of the billet clamping and turning structures.

FIGURE 8 is a view taken on line 8—8, FIGURE 7.

FIGURE 11 is a view taken on line 11—11, FIGURE 9.

FIGURE 12 is a view taken on line 12—12, FIGURE 9.

Figure 13A:
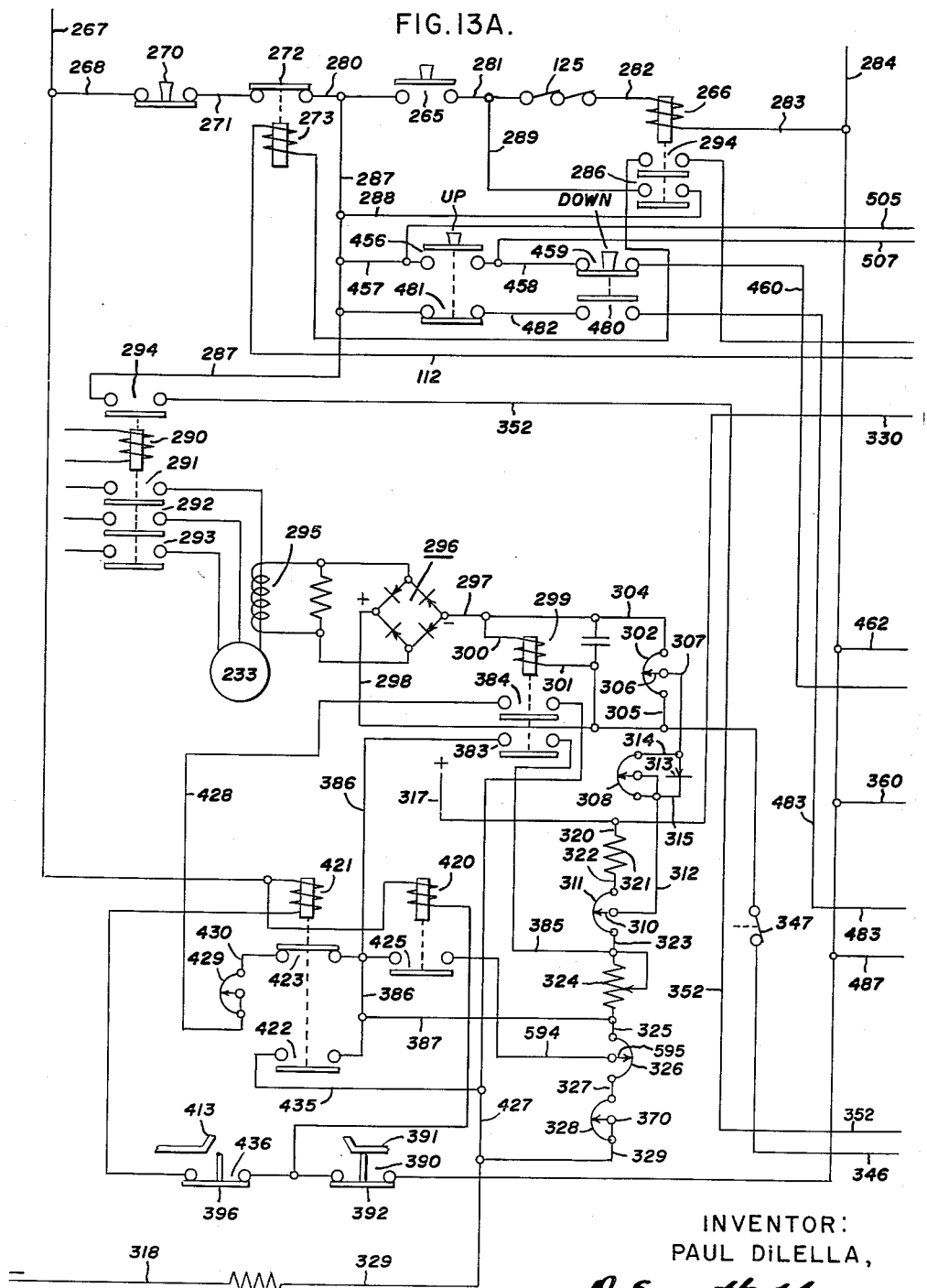
Figure 13B:
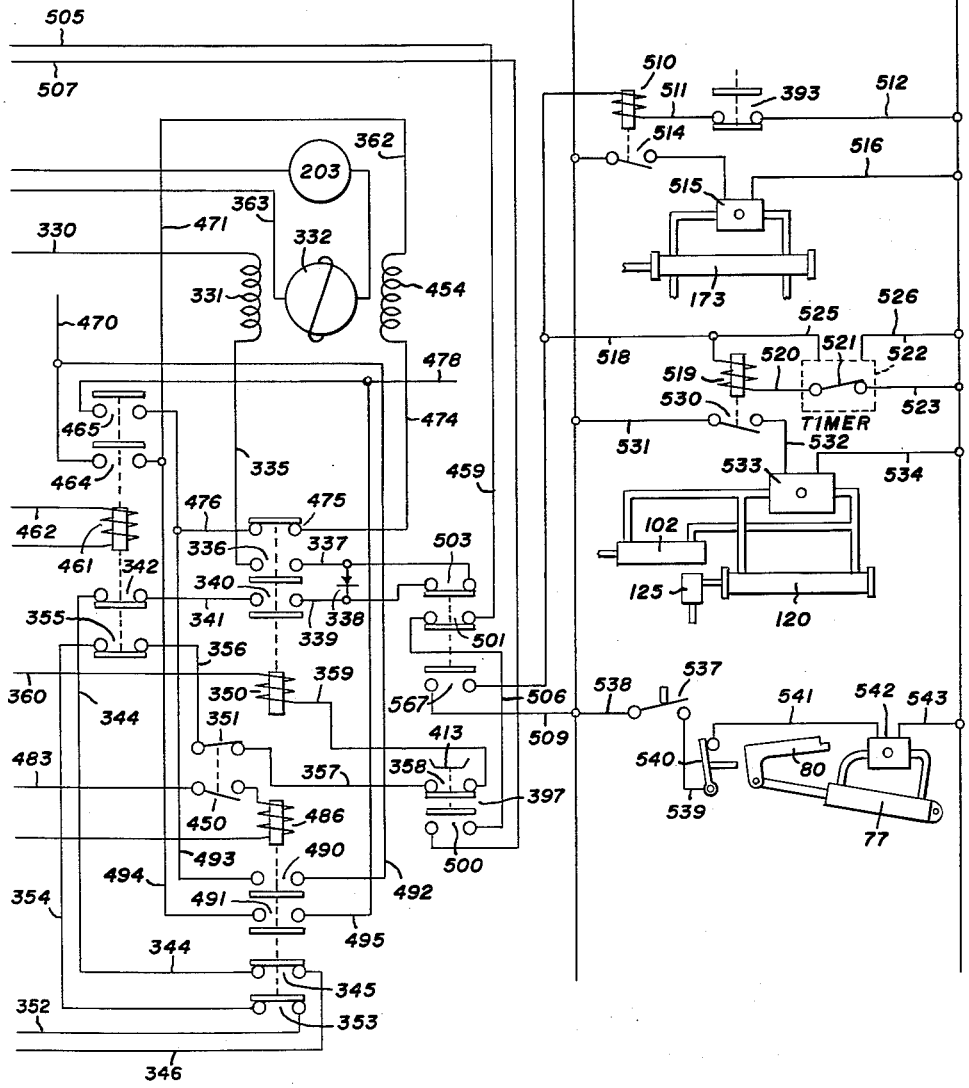

FIGURES 13A and 13B constitute a schematic wiring diagram of the electrical control circuit. In reading these figures, FIGURE 13B is placed to the right of FIGURE 13A.

Figure 6:
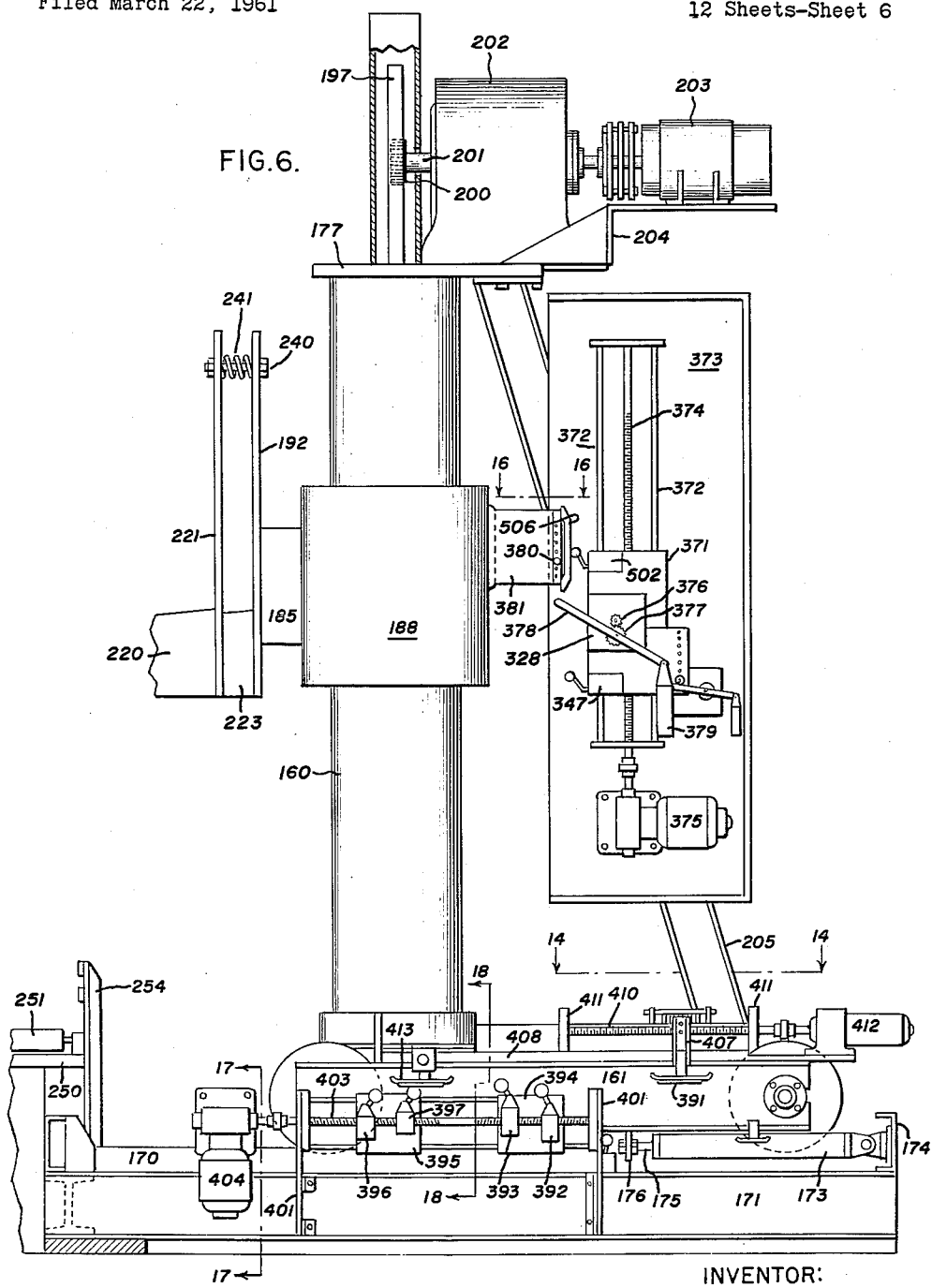
FIGURE 6 is an enlarged end elevational view of the rear portion of the machine, taken on line 6—6, FIGURE 3.
Figure 9:
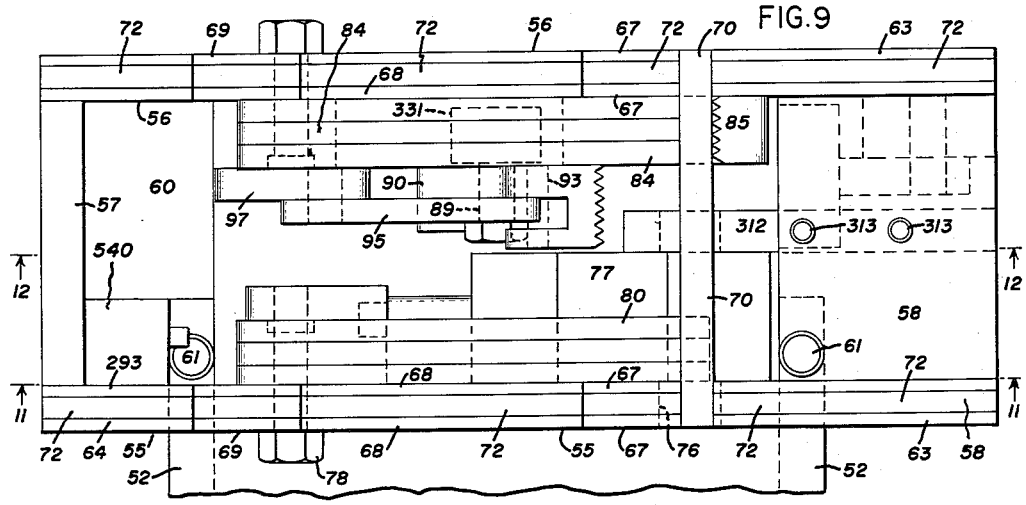
FIGURE 9 is an enlarged top plan view of the structure appearing at the left portion of FIGURE 7.

FIGURE 14 is a view indicated by line 14—14, FIGURE 6.

FIGURE 15 is a view taken on line 15—15, FIGURE 14.

FIGURE 16 is a view taken on line 16—16, FIGURE 6.

FIGURE 17 is a view taken on line 17—17, FIGURE 6.

FIGURE 18 is a view taken on line 18—18, FIGURE 6.

In general, the invention comprises a table having means for clamping the work piece, or billet, in fixed position, and means for effecting reciprocation of the table in a direction lengthwise of the billet. A carriage is mounted for movement toward and from the table in a direction transversely thereof. A support member is mounted on the carriage for vertical movement, and a grinding wheel mount is carried by said support and is arranged to have limited vertical movement relative to the support, and means is provided for yieldingly urging the mount downwardly relative to the support. The carriage is moved forwardly, or toward the table, to position the grinding wheel carried by the mount above the billet. The support is moved downwardly to move the grinding wheel into engagement with the front corner edge of the billet, at which time the table is being reciprocated to effect movement of the billet lengthwise while the grinding wheel is in engagement therewith. Upon each reciprocation of the table, the carriage is moved rearwardly, whereby the upper surface of the billet is ground. When the then upper surface of the billet is completely ground, the wheel mount support is automatically raised and the carriage moves forwardly and during this operation, the billet is unclamped and rotated 90° to bring an adjacent side of the billet up, and the billet is automatically again clamped in this turned position. The cycle is then repeated until all four sides of the billet have been ground, whereupon the billet is released and discharged from the clamping mechanism, and a new billet is inserted therein. During the entire grinding operation, a predetermined pressure is automatically maintained between the grinding wheel and the billet. The control mechanism for the machine permits the operator at any time to take the machine out of automatic operation for manual control.

Referring to the drawings, the billet supporting table is mounted for reciprocation on a pair of bars 20 circular in cross section and extending in parallel spaced relation. These bars are supported at their ends by angle plate brackets 21 having reinforcing ribs 22. The brackets 21 are fixedly secured to the ends of front and rear base beams 24, 25. The ends of the bars 20 are of reduced diameter extending through the angle plates 21 and being fixedly secured by nuts 26. The table structure consists of a pair of channel members 27 fixedly secured, as by welding, to a flat top plate 28. There are three shafts 30 fixedly mounted in the middle portion of the members 27 and extend transversely thereof. On each end of the shafts 30, there are journalled rollers 31, formed concave at their peripheries, for rolling engagement on the supporting bars 20, see FIGURE 4. Vertically disposed bars 32 are fixedly secured to cross plates 33 fixed to the base beams 24, 25, by angle plates 34. Bars 35 are fixed to the upper ends of the bars 32 and extend lengthwise of the table and inwardly over the rollers 31. Bars 37 are fixed to the bars 35 and have their lower edges formed convex for moving in close relation to the rollers 31. This arrangement prevents any upward movement of the table from the supporting rods 20. There are a number of plates 38 welded or otherwise fixed between the side members 27 of the table, and I-beam 40 is fixed to the plates 38 and extends lengthwise of the table. A gear rack 41 is fixed to the under side of the depending beam 40, as by bolts 42. The front base beam 24 is formed at its center with an opening in which there is mounted a gear reducing unit 43 having a laterally extending bracket 44 on which there is fixed a driving motor 45. The output shaft 46 of the gear reduction has affixed thereto a pinion 47 engaging with the rack 41. The motor 45 is a reversible motor and this arrangement is employed to effect reciprocation of the table in a lengthwise direction.

The billets B are secured to the table by a pair of billet clamping structures, best shown in detail in FIGURES 7 to 12. There is affixed to the table top 28 a pair of guide members 50 for each clamping and turning mechanism, as by cap screws 51. Side plates 52 are mounted in vertical edgewise position on the table top 28 and are formed on their inner confronting surfaces with lengthwise extending grooves to slidably receive outwardly extending flange portions 54 formed on the guide members 50. Both billet clamping structures embody the same construction and therefore the explanation of one clamping structure will suffice.

The billet clamping and turning structures are mounted on the side plates 52, these structures including end plates 55, 56, extending in parallel spaced relation transversely of the table. A rear plate 57 is fixedly secured between the side plates 55, 56, and a horizontally disposed plate 58 is fixedly secured between the plates 55, 56, at the front ends thereof. A rectangular plate 60 is affixed to the inner surface of the side plate 55 and the back plate 57, the plate 60 extending horizontally coplanar with the plate 58. These plates 58, 60, are positioned on the upper edges of the members 52 and are affixed thereto, as by screws 61.

The upper edges of the plates 55, 56, at the front portions thereof, incline downwardly as at 63, and the rear portions of the top edges of the plates incline downwardly, as at 64. The intermediate portions of the side plates 55, 56, are formed with notches having downwardly and rearwardly inclined front walls 67 and upwardly and rearwardly inclined walls 68 merging with relatively short horizontal portions 69. A bar 70, rectangular in cross section, is positioned in notches formed in the top edges of the plates 55, 56, intermediate the inclined surfaces 63, 67. This bar 70 is fixedly secured to the side plates, as by welding, the upper side of the bar being in line with the horizontal rear surfaces 69. The upper edges of the plates 55, 56, including the surfaces 63, 64, 67, 68, 69, are formed with lengthwise extending slots in which are fixedly secured hardened wear strips 72.

The side plates 55 are formed with depending portions 74, and the plate 58 is formed with a similar depending portion 75. These parts 74, 75, are formed with aligned apertures to receive a pin 76 forming a pivotal mount for a cylinder 77. An angle lever is pivotally mounted on a stud 78 fixed to the side plate 55. This angle lever has an elongated leg portion 80, the upper surface of which normally extends in the plane of the bar 70, and the wear strip 72 on the edge surface 69. This angle lever has a depending leg portion 81 pivotally connected to a clevis 82 carried by the piston rod 83 of the cylinder 77, the forward end of which is mounted on the pin 76. When fluid pressure is applied to the free end of the cylinder, the angle lever 80, 81, is in the position shown in FIGURE 8 with its upper edge in line with the bar 70 and wear strip 72 on surface 69 of the side plate 55 for the support of a billet B. The forward end of the leg 80 is notched complemental to the bar 70, whereby the bar forms a stop for the leg 80 of the angle lever when it is in its raised position. An arm 84 is pivotally mounted on the stud 78. The forward end of the arm 84 is formed with a serrated jaw 85 for engaging the front vertical side of the billet B. The under side of the arm 84 is formed with an arcuate surface 87 engaged by a roller 88 journalled on a stud 89 affixed to a link 90 pivotally mounted at is lower end on a stud 91 carried by the side plate 56. A jaw member 93 is pivotally attached to the upper end of the link 90.

Figure 10:
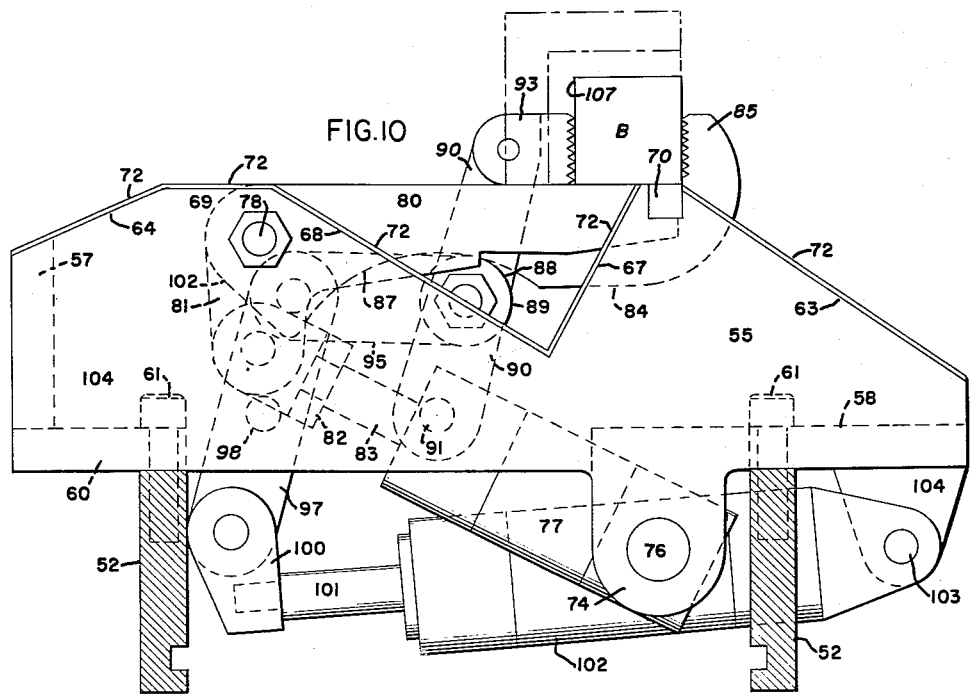
FIGURE 10 is a side elevational view looking up in FIGURE 7.

A link 95 is pivotally connected at one end to the stud 89, the opposite end of the link being pivotally connected to the upper end of a link 97 pivotally mounted intermediate its ends on a stud 98 carried by a boss 99 affixed to the inner surface of the side plate 56. The lower end of the link 97 is pivotally connected to a clevis 100 connected to a piston rod 101 of a cylinder 102. The forward end of cylinder 102 is pivotally mounted on a pin 103 carried by a bracket 104 depending from plate 58. In FIGURES 8 and 10, fluid pressure has been applied to the pivotal end of the cylinder 102, moving the piston rod 101 to rear position and with the link 90 moved to the position shown with the jaw 93 engaging the rear side of the billet B and clamping it against the jaw 85.

When fluid pressure is admitted to the free end of the cylinder, the piston rod 101 is moved forwardly, moving the upper end of the link 95 rearwardly, and moving the link 90 in a counter-clockwise direction about the pivot 89 to the position shown in FIGURE 11. This effects rearward movement of the roller 88 and, because of the arcuate surface 87 on the bottom side of the arm 84, the arm is permitted to drop, moving its jaw 85 downwardly between the plates 55, 56, to the position shown in FIGURE 11.

When the jaws 85, 93, have been opened to the position shown in FIGURE 11 to release the billet B, fluid pressure is admitted to the pivotal end of the cylinder 77, moving its piston rod 83 rearwardly, causing the arm 80 to drop downwardly so that the upper edge of the arm 80 assumes a position substantially co-planar with the inclined wear strip 72 on surface 68 of the side plates. Due to the fact that the forward bottom edge corner of the billet B, FIGURES 10 and 12, is positioned on the fixed bar 70, the billet will now rotate in a counter-clockwise direction and fall into the notches formed in the side plates 55, 56, the rear side 107 of the billet, previously engaged by the jaw 93, now resting upon the inclined wear strip 72. In other words, the billet has made a quarter turn. When fluid is admitted to the free end of the cylinder 77, moving the piston rod 83 forwardly, the arm 80 of the angle lever is moved upwardly, raising the billet back to the plane of the top side of the bar 70. Thereupon, fluid pressure is admitted to the pivoted end of the cylinder 102, moving the jaw 93 forwardly and, by action of the roller 88, swinging the arm 84 upward. The arrangement is such that the arm 84 is moved in its upward billet clamping position prior to the application of the clamping action by the jaw 93.

End clamping structures are provided for engaging the ends of the billets after they have been clamped by the clamping and turning structures just described. The side plates 52 extend from the clamping and turning structures toward the ends of the table 28 and there is fixed to the extended portions of the side plates 52 a top plate 112, see FIGURES 7 and 8. There are a pair of guide members 113 fixed to each top plate 112, as by cap screws 114, these members extending in parallel spaced relation and are in form similar to the guide members 50. A block 115 is positioned on the plate 112 and the lower portions of its sides are formed with grooves for sliding cooperation with the guides 113. An angle plate 116 is fixedly secured to the top of the block 115 and has an upstanding flange 117 positioned for engagement with the end of the billets B.

The block 115 is moved toward and from the billet clamping and turning structures by a piston rod 118 mounted in a cylinder 120 having trunnions 121 mounted in bearings 122 fixedly secured to the top plate 112. When fluid is admitted to the outer end of the cylinder 120, the block 115 is moved to the left, FIGURES 7 and 8, effecting movement of the angle flange 117 against the end of the billet positioned in the clamping and turning structures. Preferably, a hardened wear rod 124 is fixed to the flange 117. A switch 125 is mounted on the block 115 and a switch actuator 126 is provided for engagement by the end of the billet B when the clamp is in engagement therewith. The switches 125 are connected in series in circuity hereinafter described in such manner that the machine can not be started unless both end clamps are in clamping engagement with the ends of the billet. When fluid is admitted to the inner ends of the cylinder 120, the end clamps are moved to the right, FIGURES 7 and 8—that is, in a direction away from the ends of the billet supported on the billet clamping and turning structures.

It has been previously pointed out that the side plates 52 are slidably mounted on the table top 28 for movement in a direction lengthwise of the table. Referring again to FIGURES 7 and 8, a nut 130 is secured to the under side of the top plate 112, as by screws 131. A screw 132 is journalled in bearings 133 fixed to the table top 28, as by cap screws 134, the screw 132 extending through the nut 130 and accordingly being operable, upon rotation, to move the entire clamping and turning assembly in a direction lengthwise of the table 28. Rotation is imparted to the screw 132 by a motor 135 fixedly secured to the table top 28 and having a speed reducing unit 136, the output shaft 137 of which is connected through a flexible coupling 138 to the screw 132. The motor 135 is reversible. With this arrangement, the spacing between the billet clamping and turning structures can be adjusted to accommodate billets of varying length.

A bar 140 is fixedly secured to each of the blocks 115, and extends forwardly and downwardly, and each bar 140, see FIGURES 1, 3, 7 and 8, is provided at its outer end with a shoe 142 for engaging the actuators of switches 143 mounted on a bar 144 fixed to the upper end of the vertical members 32. The switches 143 are adjustable along the bar 144 and secured in adjusted position by a hand screw 146. The switches 143 control the circuit to the reversible table actuating motor 45. Because the bars 140 are fixed to the billet end clamping structures, the extent of the reciprocating movement of the table is thus automatically controlled in proportion to the length of the billet being ground to assure that the travel of the table is sufficient to grind the entire length of the billet.

The grinding wheel mount is carried by a support slidably mounted on columns 160 vertically mounted on a carriage having movement toward and from the table 28 in a direction transversely thereof. The carriage is formed of channel shaped side members 161 arranged in spaced apart pairs and fixed in this relation by top plates 162 welded to the top flanges of the channel members, see FIGURES 2 and 3. The side members are connected by a plurality of transversely extending I-beam members 163 on which are fixedly secured plates 164, 165. The lower ends of the columns 160 are formed with cylindrical flanges 166 securely attached to the plates 164, 165, by cap screws 167. Supporting wheels 168 are journalled between the side channel members 161 at opposite ends thereof. The rollers 168 are grooved at their peripheries for rolling engagement on rails 170 fixedly secured to I-beams 171. The carriage is reciprocated along the rails 170 by a cylinder and piston structure comprising a cylinder 173 mounted at its rear end to a cross member 174 fixed to the I-beams 171, see FIGURE 6. The piston rod 175 is connected to an angle bracket 176 secured to the center cross members 163.

A plate 177 is fixed to the upper ends of the columns 160. The columns 160 are hollow and there is a weight 180 in each of the columns, see FIGURE 2. These weights are attached to cables 181 trained over sheaves 182 journalled in brackets 183 secured to the top plates 177. The cables 181 extend downwardly and are attached to brackets 184 secured to a cylindrical collar 185. The cylindrical collar 185 consists of part of the wheel mount support, it being fixed to transverse members 187, see FIGURE 5, which at their ends are welded to cylindrical members 188 slidably mounted on the columns 160. The collar 185 is further secured by gusset members 190 welded to the collar and to the cylindrical members 188. A cylindrical plug 194 is mounted in the collar 185 and carries a plate 192. The plug 194 is rotatably mounted in the collar 185 and means, not shown, is provided for securing it in fixed relation to the collar.

The plate 177 is apertured to receive a gear rack 197 secured to one of the cross members 187 by a bracket 198 fixed to the cross member and fixed to the rack by cap screws 199.

The upper portion of the rack 197 is in mesh with a pinion gear 200 carried on the output shaft 201 of a gear reducing unit 202 coupled to a reversible motor 203 mounted on a bracket 204 fixed to the top plate 177. The plate 177 is partially supported by inclined brackets 205 fixed at their lower ends to the carriage top plate 165 and at their upper ends to the under side of the plate 177, see FIGURES 2 and 3. The reversible motor 203, through the pinion and rack arrangement, serves to move the wheel mount support vertically on the columns 160.

Figure 1:
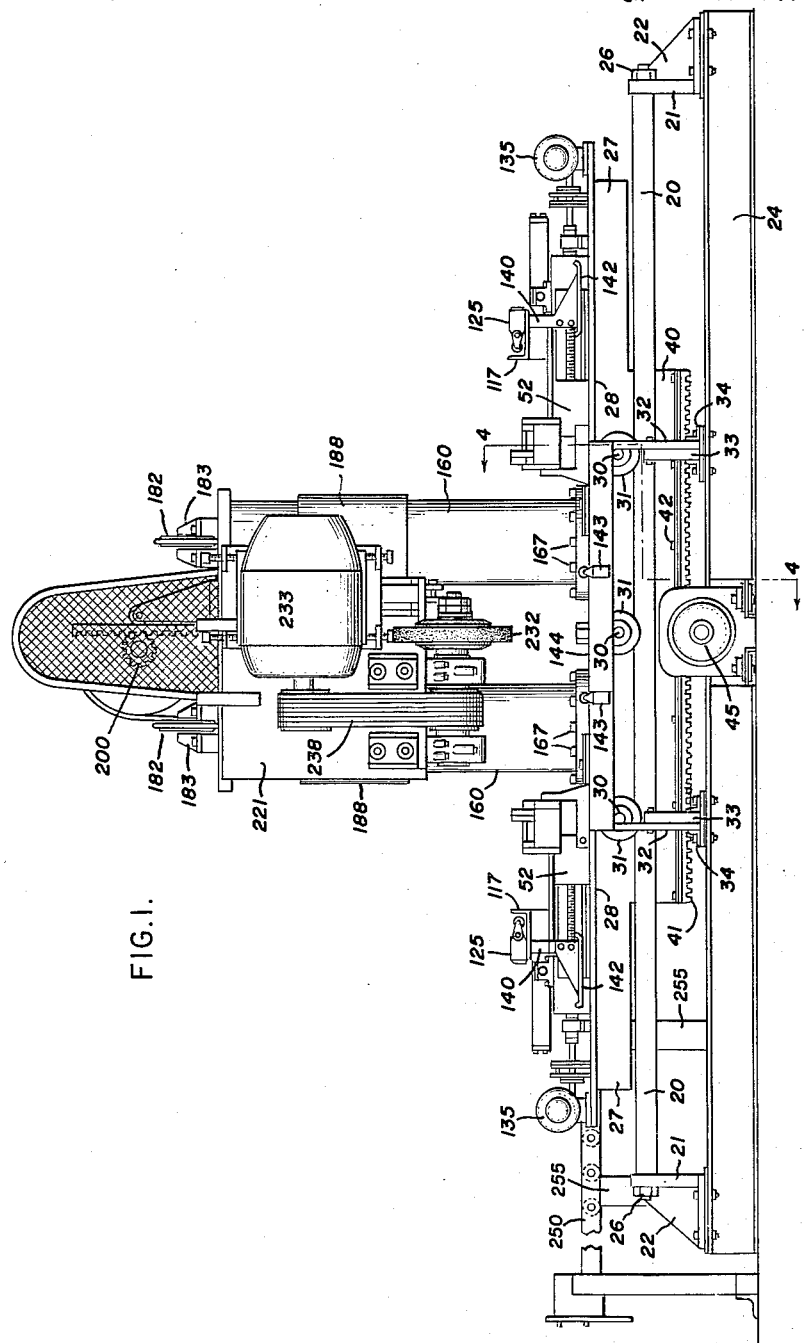
FIGURE 1 is a front elevational view of a grinding machine embodying my invention.
Figure 2:
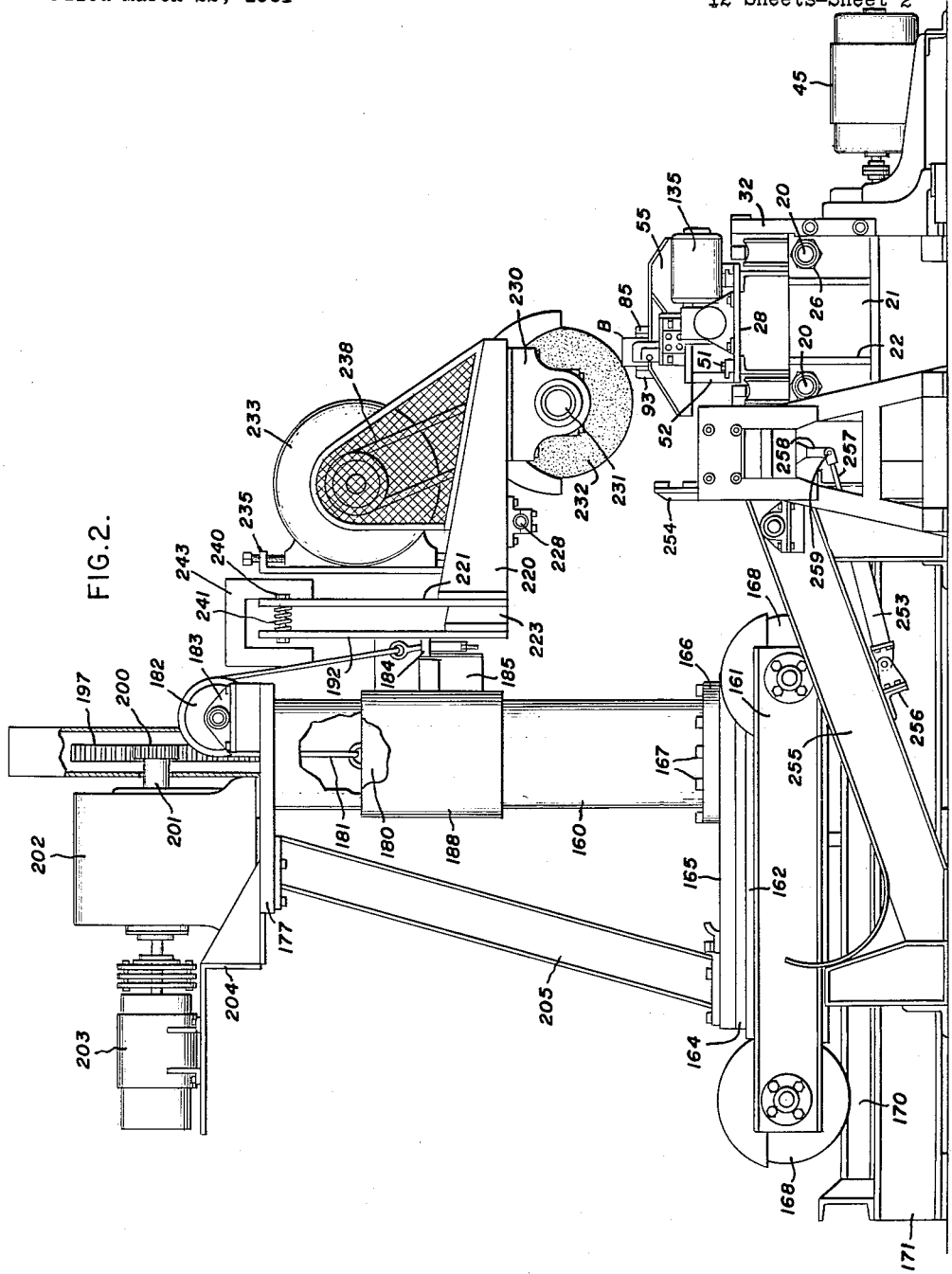
FIGURE 2 is an end elevational view of the machine looking to the right, FIGURE 1.
Figure 3:
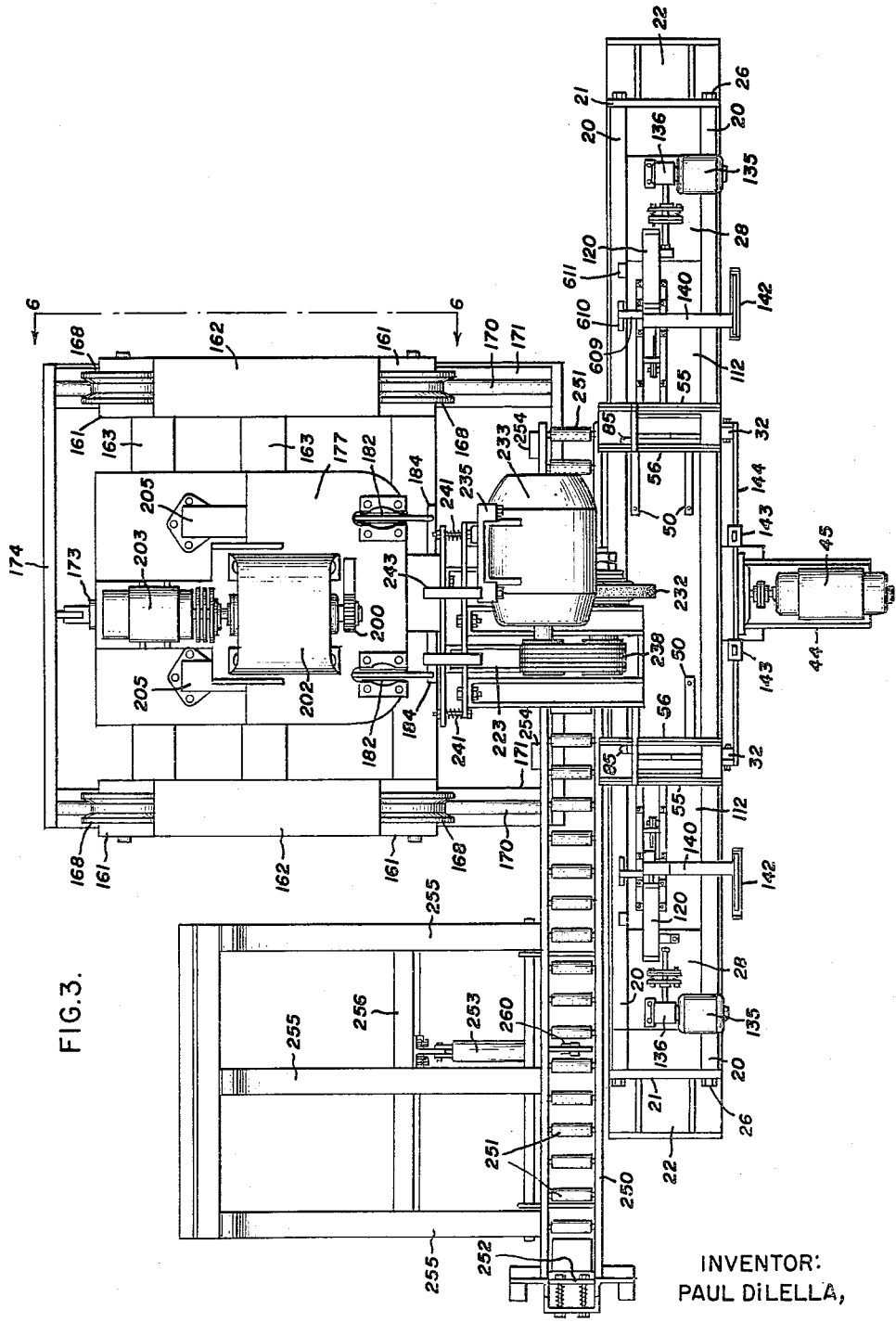
FIGURE 3 is a top plan view.
Figure 5:
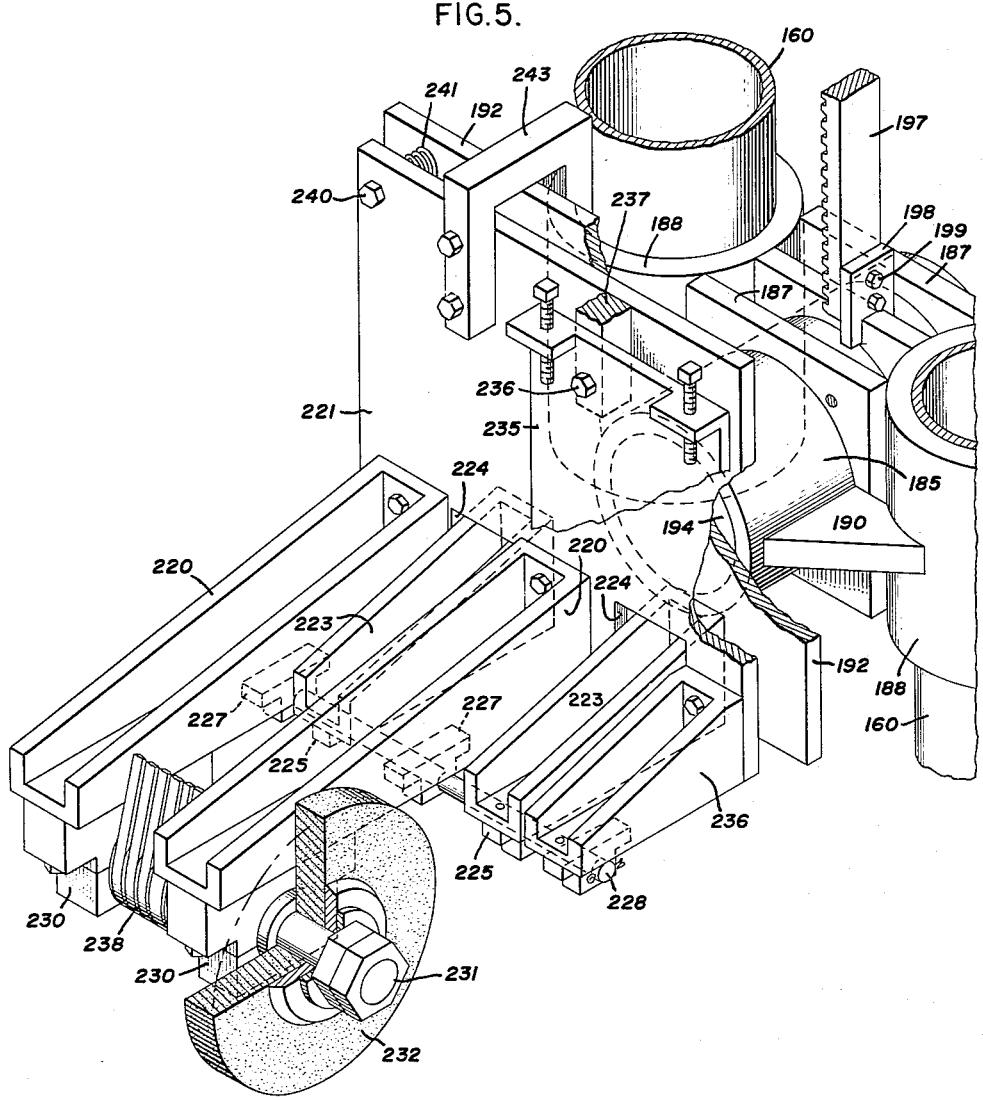
FIGURE 5 is an isometric view of the grinding wheel mount structure.

The wheel mount consists of a pair of channel shaped arm members 220 fixed at their inner ends to a plate 221, see FIGURE 5. There are a pair of similar arms 223 fixedly secured to the plate 192 and extending forwardly therefrom through apertures 224 formed in the plate 221. These arms 223 carry, at their outer forward ends, bearing blocks 225 and there is affixed to the under sides of the arms 220, intermediate their ends, bearing blocks 227. A shaft 228 extends through the bearing blocks 225, 227, whereby the arms 220 and the plate 221 are pivotally mounted on the shaft 228. Bearing brackets 230 are secured to the under sides of the arms 220 adjacent the outer ends thereof, and a grinding wheel arbor 231 is journalled in these bearings and is provided with means for clamping a grinding wheel 232 for rotation with the arbor. This rotation is effected by a grinding wheel operating motor 233 mounted on a plate 235 fixedly mounted on the plate 221, as by cap screws 236 extending through the plate 235 and a spacer bar 237 and threaded into the plate 221. The motor 233 is operatively connected to the wheel arbor 231 by a belt drive 238. Pivotal movement of the arms 220 and plate 221 in a clockwise direction, FIGURE 2, is limited by bolts 240 positioned in the upper ends of the plates 192, 221. A helical compression spring 241 is mounted on each of the bolts 240 and yieldingly urges the plate 221 and the arms 220 in a direction away from the plate 192—that is, in a direction to move the grinding wheel 232 toward the billet B positioned in the clamping and turning structures on the reciprocating table. U-shaped members 243 are fixed to the plate 221 and extend upwardly, and over the top edges of the plates 192, 221, and downwardly rearwardly of the plate 192. These members 243 simply serve as a safety precaution to limit downward pivotal movement of the grinding mount about the shaft 228 in the event the bolts 240 should become defective.

This arrangement provides for limited vertical movement of the wheel mount relative to the support, and the wheel is yieldingly urged into engagement with the billet by the weight of the wheel mount and the wheel assembly, plus the action of the springs 241. This forms an important feature of my invention as it permits automatic up and down adjustment of the support in response to a slight variation in the pressure between the grinding wheel and the billet, all whereby response to even a slight change in wheel pressure permits the motor 203 to change the elevation of the support in quick response to even a slight variation in wheel pressure.

The grinder stops with the wheel mount in the up-forward position. The machine can not start unless a billet is clamped in the billet clamping and turning structures, and the end clamps 124 have been moved into clamping engagement with the ends of the billet, and the contacts of the switches 125 closed. If a billet is properly clamped on the table, the machine may be started. The wheel mount moves downwardly to bring the wheel into contact with the front corner edge of the billet and at this time, the table is being reciprocated. Upon each reciprocation of the table, a predetermined amount of fluid is admitted to the front end of the cylinder 173 to cause the support carriage to move rearwardly a short distance, this operation being repeated with each reciprocation of the billet supporting table until the grinding wheel 232 has finished grinding the upper flat side of the billet, whereupon the wheel mount support is moved upwardly and forwardly, during which time the billet clamping and turning structures are operated, as previously described, to bring the next side of the billet upwardly. When the billet has been reclamped, the wheel mount support will move downwardly and the second side of the billet will be ground. This cycle of operation is repeated until all four sides of the billet have been ground, whereupon a billet storage and feeding conveyor is operated to move a new billet into the clamping structures and to push the ground billet inwardly from the clamping structures so that it may drop onto an inclined roll conveyor 250. This conveyor is positioned rearwardly of the billet reciprocating table and extends lengthwise thereof, see FIGURE 3, and is constructed with a series of rolls 251. The ground billets gravitate down the conveyor 250 and strike against a spring pressed plate 252 which actuates a switch controlling a solenoid operated valve to admit fluid to the lower end of a cylinder 253. Bumper members 254 are fixedly secured to the machine frame and extend upwardly from the conveyor 250 to direct the discharged ground billets onto the conveyor.

There are a series of downwardly inclined beams 255 having their upper ends attached to the inner side rail of the conveyor 250. The cylinder 253 is pivotally attached at its lower end to a cross member 256 fixed to the beams 255. The piston rod 257 is connected to an arm 258 pivoted at 259 and having a horizontal arm 260 normally positioned between a pair of the rolls 251. When fluid is admitted to the lower end of the cylinder 253, the arm 260 moves upwardly, effecting movement of the ground billet from the conveyor to the inclined beams 255. The billet storage and in-feed conveyor device may be of any suitable construction such, for example, as that shown in Lowe Patent No. 2,819,563.

The machine is started by first closing a starting switch 265 to pull in relay 266. This circuit extends from supply line 267, wire 268, closed contacts of stop switch 270, wire 271, closed contacts 272, of an overload relay 273 connected in the power supply to the support positioning motor 203, wire 280, starting switch 265, wire 281, contacts of switches 125 on the billet end clamps, closed when a billet is properly clamped on the table, wire 282, relay 266, wire 283, to the opposite side 284 of the line.

Relay 266 is provided with contacts 286 to provide a stick circuit in parallel with the starting switch 265 through wires 287, 288, contacts 286, and wire 289.

The motor starter 290 is energized to close its contacts 291, 292, 293, to energize the grinding wheel motor 233. The motor starter 290 also includes a pair of contacts 294. A current transformer 295 is connected in the power line to the grinding wheel motor 233 and supplies power to a full wave rectifier 296 having an output 297, 298, across which there is connected a relay 299 by wires 300, 301.

A voltage divider 302 is also connected across the line 297, 298, by wires 304, 305. The movable contact 306 of the voltage divider is connected to a wire 307 which extends to a potentiometer rheostat 308, the opposite side of which is connected to the movable contact 310 of a voltage divider 311 by wire 312. The potentiometer rheostat 308 has a shunt in the form of a rectifier 313 connected to the rheostat by wires 314, 315.

A regulated supply of D.C. voltage is provided on line 317, 318. The wire 317 is plus, and the wire 298 from the rectifier is plus. There is a circuit connected across the line 317, 318, consisting of wire 320, limiting resistor 321, wire 322, voltage divider 311, wire 323, variable resistor 324, wire 325, voltage divider 326, wire 327, potentiometer rheostat 328, wire 329, to wire 318. Wire 317 is connected through wire 330 to one side of a control field 331 of a control device, as a compensated armature-reaction-excited dynamo electric generator, indicated at 332. A device of this type is manufactured by the General Electric Company, and is referred to as a Amplidyne.

The opposite side of the field 331 is connected to wire 298, through wire 335, contact 336, wire 337, diode 338, wire 339, contacts 340, wire 341, contacts 342, wire 344, contacts 345, wire 346, down limit switch 347, carried by the wheel mount support 188, see FIGURE 6, to wire 298.

With the wheel mount in the up-forward position, and with the circuit energized for automatic pressure control, contacts 342, 345, are closed. Contacts 336, 340, are closed by relay 350. This relay is energized to close contacts 336, 340, by a manually operable switch 351, the circuit being from wire 287, closed contacts 294, of the grinding wheel motor starter, wire 352, contacts 353, wire 354, contacts 355, wire 356, switch 351, wire 357, closed contacts 358, of back travel limit switch 397, wire 359, relay 350, wire 360, to wire 284. The closing of contacts 336, 340, completes the circuit from wires 298, 317, to the field 331.

The head positioning motor 203 is connected to the output wires 362, 363, of the control device 332. The motor 203 is a reversible motor and its forward and reverse direction is controlled by the polarity imposed upon the control field 331. As previously stated, the D.C. source 317, 318, is regulated to supply a reference voltage. The algebraic sum of the output voltages from voltage divider 311 and voltage divider 302 are fed to the field 331. The output polarity of the control device 332 is determined by the polarity of the field 331. The polarity of this field is determined by the current drawn by the grinding wheel motor 233. When the current drawn by the grinding wheel motor 233 produces a voltage across voltage divider 302 which is greater than the reference voltage across voltage divider 311, the polarity of field 331 is such that the output voltage in wires 362, 363, of the control device 332 causes the motor 203 to move the grinding wheel support upwardly, moving the wheel away from the work. The reverse action is also true, that is, when the reference voltage across the divider 311 is greater than the voltage across the divider 302, the motor 203 moves the wheel mount support and grinding wheel downwardly toward the work.

The pressure at which the grinding wheel 232 engages the work piece is predetermined or varied as desired by adjusting the contact 310 of the voltage divider 311 to increase or decrease the reference voltage.

It will be understood that by so increasing or decreasing the reference voltage effecting change in the pressure between the grinding wheel and the work piece, there is a resultant change in the current drawn by the motor 233 and accordingly, a change in the rectifier output 297, 298—that is, a change in the voltage across the divider 302, this bringing about the situation where the voltage across divider 311 and the feed back or signal voltage divider 302 are equal and opposite in polarity. This results in an algebraic sum of voltages equal to zero impressed upon the field 331, so the output in wires 362, 363, is zero, and the motor 203 comes to rest. Accordingly, the grinding wheel pressure is determined by the setting of the contact 310 of voltage divider 311 and thereupon, the machine will function at that pre-set grinding pressure which, in turn, determines the thickness or amount of material ground off from the billet.

If the surface of the billet being ground is not straight—for example, if the surface being ground curves upwardly, the pressure between the grinding wheel and the billet is therefore increased, causing a raise in the voltage across the divider 302, whereupon the wheel mount positioning motor 203 will effect upward movement of the wheel mount support to reduce the pressure between the wheel and the billet. As this pressure decreases, the voltage across divider 302 decreases, and when that voltage becomes equal to the voltage across divider 311, the motor 203 will cease operation. When the upwardly curved or high spot of the billet is ground off and the load accordingly decreases on the grinding wheel motor 233, the output voltage across divider 302 decreases, effecting reversal of the polarity in field 331, causing the motor 203 to lower the wheel mount support until the pressure of the grinding wheel on the billet is re-established to the pre-set value. Actually, these changes in the elevation of the wheel mount support take place instantaneously, all whereby the wheel grinding at the pre-set pressure very closely follows the contour of the billet, whereby a uniform thickness of metal is removed from the billet.

Returning again to the situation where the wheel mount is in the up-forward position, that is, with the grinding wheel positioned upwardly from the front corner edge of the billet, the voltage across divider 302 will be low due to the substantially absent power demand on the grinding wheel motor 233 relative to the voltage across divider 311 from the regulated supply. This would result in a relatively high current flow in the field 331, effecting rapid downward movement of the wheel mount support by the motor 203, whereupon the grinding wheel would engage the billet under excessive pressure. To avoid this situation, the circuitry includes components which function automatically to control the operation of the motor 203 to effect a gradual descent of the motor mount as the grinding wheel approaches the front corner edge of the billet. In other words, the selected pre-set grinding pressure is automatically modified during descent of the wheel mount from up position to contact with the billet.

These components include the limiting resistor 321, voltage dividers 311, 326, potentiometer rheostat 328, and variable resistor 324. These components, as will be apparent, determine the voltage across divider 311. After the grinding wheel has descended into engagement with the billet, the variable resistor 324 is shunted to remove it from the circuit, and during descent of the grinding wheel, the potentiometer rheostat 328 is automatically adjusted to effect a reduction across the divider 311.

Due to the frictional engagement between the collars 188 of the wheel support and the columns 160, considerably more power is required of the motor 203 to start the support downwardly than is required to maintain it in downward motion. The movable contact 370 of the potentiometer rheostat 328 is mechanically coupled with the wheel mount support. Referring to FIGURE 6, this potentiometer rheostat is mounted on a plate 371 mounted for vertical sliding movement on guide rods 372 fixedly secured to a large mounting plate 373 secured to one of the inclined column braces 205. This plate 371 is moved upwardly and downwardly by a screw 374 operated by a reversible motor 375. The movable contact 370 is mounted on a shaft carrying a pinion 376 engaging a gear 377 to which is affixed an arm 378. A weight 379 is attached to one end of the arm 378 and the opposite end is positioned to be engaged by a projection 380 adjustably mounted in a bracket 381 fixedly secured to one of the collar members 188 of the wheel mount support. As the wheel mount support moves downwardly, the projection 380 engages the arm 378, effecting rotation of the gears 377, 376, and accordingly, rotation of the contact 370. The arrangement is such that as the wheel mount support descends, the potentiometer rheostat cuts more resistance into the circuit, thereby reducing the voltage across the resistor 311, reducing the excitation of the field 331 and accordingly, reducing the speed of the motor 203, all whereby the wheel mount support descends at a slow adjusted controlled rate.

When the grinding wheel 232 engages the front corner edges of the billet, the power load immediately increases on the wheel motor 233 and accordingly, the output 297, 298, of the rectifier increases, raising the voltage across the divider 302 and also energizing the relay 299 to close its contacts 383, 384. The closed contacts 383 provide a shunt circuit for the variable resistor 324, this circuit including wire 385, closed contacts 383, wire 386, wire 387. Shunting the resistor 324 increases the voltage across the divider 311, raising the potential on wire 330 to effect downward movement of the wheel support by the motor 203 through the control device 332.

Due to the fact that the corner edge of the billet presents a relatively small area to the grinding wheel compared to the flat top side of the billet, it is desirable to establish a relatively light grinding pressure between the wheel and the corner edge of the billet compared with the pre-set grinding pressure for the top flat surface of the billet.

When the wheel mount is in the forward position, contacts 390 are opened by shoe 391, engaging the actuator of switch 392. With the wheel mount in this forward position, shoe 391 also is in engagement with the actuator of switch 393, which is a forward travel limit switch controlling fluid supply to the cylinder 173. The switches 392, 393, are mounted on a plate 394, see FIGURE 6. There is a similar plate 395 on which are mounted switches 396, 397. The plates 394, 395, are formed with projections 398 slidably mounted on rods 400, the ends of which are fixedly secured in brackets 401 secured to one of the base I-beams 171 on which the carriage is mounted, see FIGURE 18. The plates 394, 395, are also formed with projections 402 threaded to receive a positioning screw 403 journalled in the brackets 401 and operatively connected to a reversible motor 404 carried by a bracket 405, see FIGURE 17, attached to a plate 406 also welded to the beam 171. The thread of the screw 403 engaging the nut portion 402 of plate 394 is the opposite hand of that portion of the screw engaging the nut on the plate 395. Accordingly, operation of the motor 404 moves the plates and the switches carried thereby toward and from each other. The purpose of this arrangement is to compensate for the reduction in the diameter of the grinding wheel 232 by the wearing away of the wheel during the grinding operations. This variation of grinding wheel diameter requires, for efficient operation, a like variation in the front and rear limit portions of the wheel mount.

The shoe 391 is carried on an arm 407 slidably mounted on a bar 408 fixed to the carriage, see FIGURES 6, 14 and 15. The arm 407 is attached to a nut 409 traveling on a screw 410. This screw is journalled at its ends in bearings 411 and is operatively connected to a reversible motor 412. This arrangement is operable to adjust the shoe 391 in the direction of travel of the carriage, or toward and from the shoe 413.

Figure 4:
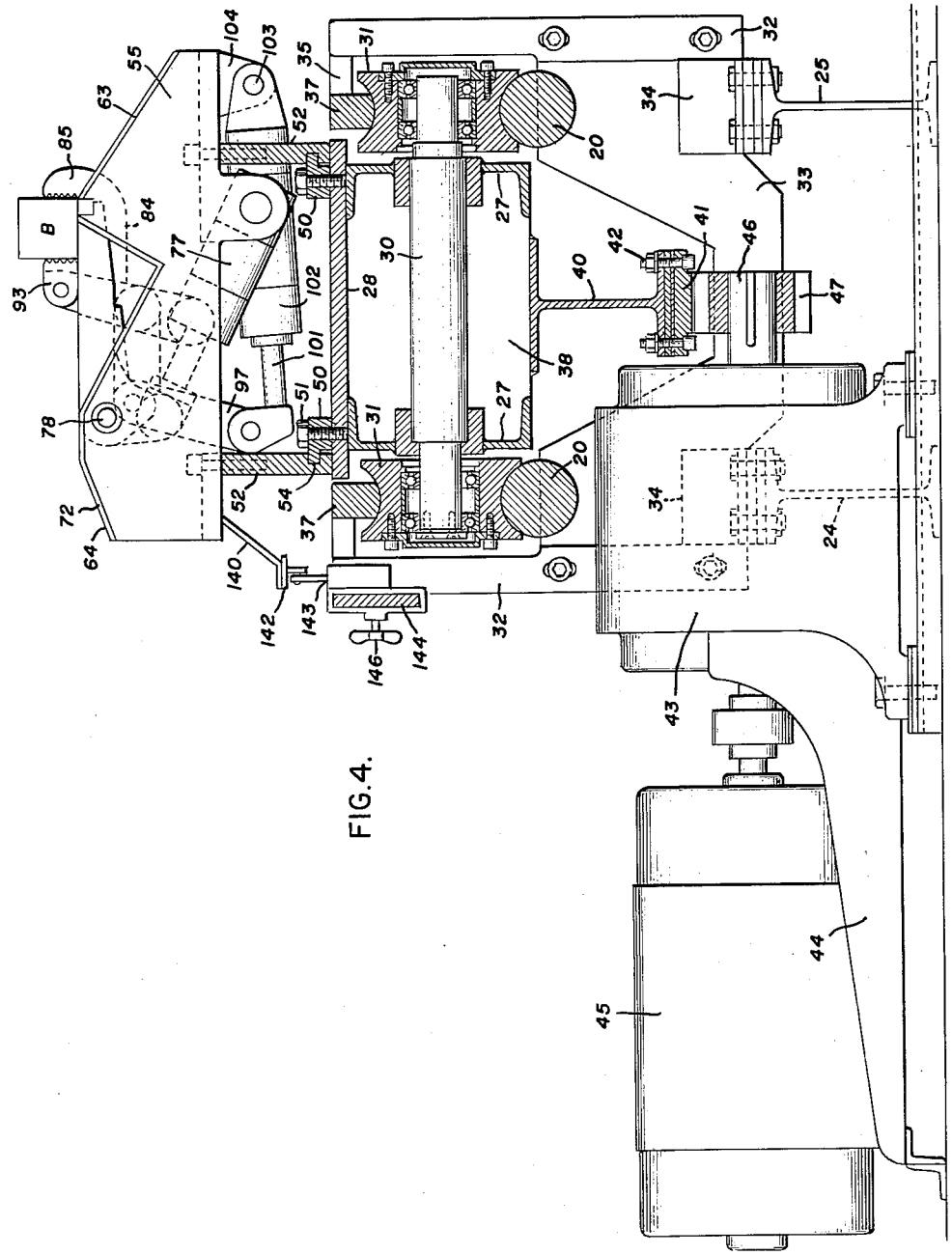
FIGURE 4 is a view taken on line 4—4, FIGURE 1.

The switches 396, 397, are actuated by the shoe 413 adjustably fixed on the bar 408. The adjustment of the shoe 391 is to effect automatic grinding operations of billets of different cross sectional dimension, such as two, four, five and six inches. As shown in FIGURE 4, the fixed billet clamping jaw 85 is arranged at the rear of the billet clamping and turning structure—that is, the billets are always clamped against the fixed located jaw 85. The clamping position of jaw 93 however varies according to the cross section of the billet. Accordingly, the switch actuating shoe 413 is not ordinarily adjusted after the machine is set up. However, the position of the shoe 391 has to be such that the carriage supporting the wheel mount support will move forwardly a sufficient distance to grind the entire top side area of a billet.

There is an arm 414 attached to the nut 409 and extends inwardly over the plate 162 of the carriage frame and has affixed to its inner end a bar 415. The bar 415 is slidably mounted in bearing blocks 416 secured to the plate 162. The under side of the bar 415 is formed with a transversely extending groove 417. A plurality of switches 418 are mounted on the plate 162 intermediate the bearing blocks 416. The actuators of these switches are permitted to move upwardly to close the contacts of the switches when the groove 417 is moved in registration with the switches respectively. The switches 418, when actuated, light pilot lamps on the control console of the machine to advise the operator as to the size billet the machine is set to grind.

Returning now to the operation of switch 392, the opening of contacts 390 drops out relays 420, 421. This results in opening the front contacts 422 and closing the back contacts 423 of relay 421, and the opening of front contacts 425 of relay 420. This arrangement provides a circuit from wire 427, now closed contacts 384, wire 428, potentiometer rheostat 429, wire 430, closed contacts 423, wires 386, 387, to wire 325. This means that the potentiometer rheostat 429 is connected in parallel with the potentiometer rheostat 328 and voltage divider 326. This presents a voltage on the divider 311 of a lower value, whereby the signal voltage in wire 312 becomes more effective in reducing the plus voltage in wire 330 to the field 331, automatically resulting in a reduced pressure between the grinding wheel and the billet while the front corner edge thereof is being ground. As previously pointed out, upon each reciprocation of the billet carriage table, the carriage with the wheel mount and support therefor is moved rearwardly. As the carriage moves rearwardly, the shoe 391 passes out of engagement with the actuator of switch 392, re-closing the contacts 390. This results in again energizing the relays 420, 421, closing contacts 422, 425, and opening contacts 423. The closing of contacts 422 provides a shunt circuit around the voltage divider 326 and potentiometer rheostat 328. This circuit is established from wire 329, wire 427, wire 435, closed contacts 422, wires 386, 387, to wire 325. This now provides a voltage across the divider 311 at whatever value the divider is set for to provide the preset grinding pressure to grind the top surface of the billet.

When the carriage moves rearwardly a distance to bring the grinding wheel in proximity with the rear corner edge of the billet, the shoe 413 engages the actuator of switch 396, opening its contacts 436, deenergizing relay 421. However, relay 420 remains energized because the contacts 390 of switch 392 are then closed. Contacts 423 are again now closed, and contacts 422 opened. This circuitry again puts potentiometer rheostat 429 in parallel with part of voltage divider 326 and potentiometer rheostat 370 to again reduce the voltage across the divider 311 to provide lighter wheel pressure for grinding the rear corner edge of the billet. This circuit is from wire 329, wire 427, contacts 384, wire 428, potentiometer rheostat 429, closed contacts 423, closed contacts 425, wire 594, to the movable contact 595 of the voltage divider 326.

It will be observed that in regulating the pressure for grinding the forward corner edge of the billet, as previously explained, the potentiometer rheostat 429 was connected in parallel with the potentiometer rheostat 328 and voltage divider 326, whereas, in the circuit controlling the pressure for grinding the rear corner edge of the billet, the potentiometer rheostat 429 is connected in parallel with potentiometer rheostat 328 and a part of the voltage divider 326. This arrangement permits the operator to adjust the rear corner grinding pressure by movement of the contact 595, this adjustment being independently of the adjustment for grinding the forward corner edge of the billet.

It will be apparent that as long as the switch 351 is closed, the machine operates to grind the top surface of the billet at a predetermined set pressure which is automatically maintained regardless of any curvatures in the billet. Also, the arrangement provides for applying selected lighter grinder pressures in grinding the forward and rear corner edges of the billet.

If the operator desires to take the machine out of automatic control for manual operation, the switch 351 is opened. A switch 450 is coupled to the switch 351 and when the latter is opened, switch 450 is closed. The control device 332, in addition to the automatic control field 331, is provided with a manual control field 454. Opening of the switch 351 de-energizes the relay 350, opening contacts 336, 340, in the control circuit to field 331 of the regulator 332.

To move the wheel mount support upwardly, the operator can close the normally open switch 456 which provides a circuit from wire 287, wire 457, switch 456, wire 458, normally closed switch 459, wire 460, relay 461, wire 462, to the opposite side 284. Relay 461, when thus energized, closes contacts 464, 465. Closing of these contacts provides a circuit from side 470 of a D.C. supply, contacts 464, wire 471, manual field 454, wire 474, closed contact 475, wire 476, closed contacts 465, to the opposite side 478 of the supply. This arrangement provides power of such polarity on the field 454 to cause the regulator 332 to actuate the motor 203 to raise the grinding mount support upwardly.

Opening the down switch 459 and closing switch 480 coupled thereto, effects a circuit from wire 287, through closed switch 481 coupled to the switch 456, and closed when the latter is opened, thence through wire 482, now closed switch 480, wire 483, closed switch 450, relay 486, wire 487, to the opposite side 284. Relay 486 closes contacts 490, 491. This establishes a circuit from wire 470, through wire 492, contacts 490, wires 493, 476, closed contacts 475 of relay 350, wire 474, field 454, wire 471, wire 494, contacts 491, wire 495, to the opposite side 478. This circuit results in reversing the polarity on the manual control field 454, causing the wheel mount support to move downwardly. Accordingly, the operator can at any time take the machine out of automatic control and operate the wheel mount support upwardly and downwardly at will.

When the top side of a billet has been completely ground and the carriage reaches the rearmost position, the back travel limit switch 397 is actuated by the shoe 413, FIGURE 6, to open contacts 358 and close contacts 500. Contacts 500 are connected in series with contacts 501 of an up limit switch 502 mounted on the plate 371, FIGURE 6. The switch 502 has a pair of normally closed contacts 503 providing a shunt circuit around the diode 338. The purpose of the contacts 503 is to provide a conductive path to the control field 331 when the positive potential on wire 298 exceeds that on the wire 300 so that, in the normal operation of the machine, the polarity of the control field 331 can change in order to maintain the constant pre-set wheel pressure, as previously explained. The diode 338 in the circuit always provides for the flow of current through the field 331 in a direction to move the wheel mount downwardly and the contacts 503, when closed, provide for the flow of current in both directions to the field 331.

The closing of contacts 500 of the rear travel limit switch 397 provides, through the closed contacts 501 of the up limit switch, a shunt circuit to the manually operable switch 456, this circuit being through wires 457, 505, contacts 501, wire 506, contacts 500, wire 507, to wire 458. As previously explained, this circuit extends to and energizes the relay 461 to apply power to the field 454 with a polarity to cause the control device 332 to energize the motor 203 to effect upward movement of the wheel mount.

When the wheel mount has moved upwardly away from the billet, the up limit switch 502 is actuated by engagement with a cam 506 adjustably mounted on the bracket 381, see FIGURES 6 and 16. This effects opening of the contacts 501 and 503, breaking the energizing circuit to relay 461 and stopping movement of the motor 203, the diode 338 being a block to the flow of current to field 331 to cause upward movement of the wheel support. The switch 502 is also provided with a third pair of contacts 567 which now close to establish a circuit from source 508, wire 509, contacts 567, relay coil 510, wire 511, contacts of forward limit switch 393, wire 512, to the opposite side 513 of the source. The closing of relay contacts 514 establishes a circuit from wire 508, contacts 514, solenoid valve 515, wire 516, to the side 513. The valve operates to apply fluid pressure to the rear end of the cylinder 173 to effect forward movement of the carriage.

The closing of contacts 567 also establishes a circuit through wire 518, relay coil 519, wire 520, contacts 521 of a timer 522, wire 523, to the opposite side 513. The timer is also energized from wire 518, wire 525, wire 526, to the side 513. Contacts 530, of relay 519, close and establish a circuit from wire 508, through wire 531, contacts 530, wire 532, solenoid valve 533, wire 534, to the side 513. The solenoid valve thus energized applies fluid to the inner or free end of the cylinders 102 to unclamp the jaws 85, 93, from the billet. It also applies fluid to the inner end of the cylinders 120 to move the billet end clamps 125 outwardly away from the billet.

An arm 535 is affixed to the clamp block 125 and carries a shoe 536 which, when the clamps are in open position, engage and actuate a switch 537. The closing of switch 537 establishes a circuit from wire 508, through wire 538, contacts 537, wire 539, switch 540, see FIGURES 9 and 11, wire 541, solenoid valve 542, wire 543, to the opposite side 513. The valve 542 thus energized, applies fluid to the pivotal end of the cylinder 77 to move its piston rod 83 to the left, FIGURE 11, and move the billet supporting arm 80 downwardly to permit the billet to roll into the notches of the turning structures. When the arm 80 is in down position, the depending leg portion 81 of the arm engages the switch 540 to open the circuit to the solenoid, reversing the application of fluid to effect upward movement of the arm and to replace the billet on the bar 70. Upon the completion of this turning operation of the billet, the timer 522 has timed out to return the solenoid valve 533 to normal position, applying fluid to the opposite end of the cylinders 102, 120, to move the jaws 85, 93, into clamping engagement with the vertical sides of the billet and the end clamps 125 into engagement with the ends of the billet.

While this turning operation has been taking place, the carriage has been moving forwardly and the shoe 391 has engaged the forward travel limit switch 393, FIGURE 6, opening the contacts to break the circuit to the relay 510 and the circuit to the solenoid valve 515, controlling the supply of fluid to the cylinder 173. It will be apparent that as the carriage moves forward, shoe 413 disengages from the back travel limit switch 397, opening the contacts 500 which, in turn, opens the shunt circuit around switch 456 to the up relay 461, and this relay becoming deenergized, re-establishes its contacts 342, 355 and now closed contacts 358 of the rear travel limit switch 397 re-establishes the circuit for energizing the relay 350, closing its contacts 336, 340, whereby together with the closed contacts 342, the circuit to the automatic control field 331 is now reestablished and the control device 332 will energize the motor 203 to move the wheel mount support downwardly for the grinding of the side of the billet, now positioned upwardly, in the manner previously explained.

What I claim is:

1. A grinder comprising a table having clamping means for clamping a work piece in fixed position thereon, means operable to effect reciprocation of said table, a support mounted for vertical movement, a grinding wheel arbor carried by said support and mounted for limited vertical yielding movement relative to said support, a grinding wheel carried by said arbor, an electric motor operatively connected to said arbor for effecting rotation of said grinding wheel, means for effecting relative movement between said table and said support in a direction transversely of the reciprocable path of said table, a power circuit for supplying said motor and means operable upon the current in said circuit exceeding a predetermined value to move said support upwardly and, upon the current in said circuit being less than a predetermined value, to effect downward movement of said support.

2. A grinding machine comprising a work piece supporting table, a support mounted for vertical movement, a grinding wheel mount carried by said support, a grinding wheel journalled in said mount above said table, said mounted having limited vertical movement relative to said support, means yieldingly urging said mount downwardly to cause said grinding wheel to engage a work piece on said table, reversible means operable in forward direction to raise said support and in reverse direction to lower said support, motor operatively connected to said grinding wheel for rotating the same, a power circuit for supplying said wheel motor, electro-responsive means connected to said power circuit and operable upon the current in said circuit exceeding a predetermined value to operate said reversible means in forward direction and being operable, upon said current being less than a predetermined value, to effect operation of said reversible means in reverse direction.

3. A grinding machine comprising a work piece supporting table, means operable to effect reciprocation of said table, said table having means to clamp a work piece thereon, a support mounted for vertical movement, a grinding wheel mount pivotally connected to said support, a grinding wheel journalled in said wheel mount, an electric motor operatively connected to said grinding wheel for rotating the same, said wheel mount being movable about said pivotal connection toward and from said table, means operable to effect relative movement between said table and support in a direction transversely of the reciprocable path of said table, a power circuit for supplying said grinding wheel motor, power operated reversible means operable in forward direction to raise said support and in reverse direction to lower said support, electro-responsive means connected to said power circuit and operable upon the current in said circuit exceeding a predetermined value to operate said reversible means in forward direction and being operable, upon said current being less than said predetermined value, to effect operation of said reversible means in reverse direction.

4. A billet grinder comprising a table having clamping means for clamping a billet in fixed position thereon, means operable to effect reciprocation of said table, a carriage mounted for horizontal movement toward and from said table in a direction transversely of the reciprocable path of said table, a vertically disposed column mounted on said carriage, a support slidably mounted on said column for vertical movement toward and from said table, a grinding wheel arbor carried by said support and having limiting vertical movement relative thereto, a grinding wheel mounted on said arbor, a grinding wheel motor operatively connected to said arbor for effecting rotation of said grinding wheel, a power circuit for supplying said motor, means yieldingly urging said arbor downwardy relative to said support, a support positioning motor connected to said support and operable in forward and reverse directions to effect movement of said support upwardly and downwardly respectively, an electro-responsive motor control mechanism connected to the power circuit of said grinding wheel motor and operable upon the current in said circuit exceeding a predetermined value to operate said support positioning motor in forward direction and being operable, upon said current being less than said predetermined value, to effect operation of said motor in reverse direction.

5. A grinding machine comprising a work piece supporting table, means operable to effect horizontal reciprocation of said table, means for clamping a work piece on said table, a support mounted above said table for vertival movement toward and from the same, a grinding wheel mount pivotally connected to said support, a grinding wheel journalled for rotation in said wheel mount, an electric motor operatively connected to said grinding wheel for rotating the same, said wheel mount being movable about said pivotal connection toward and from a work piece clamped on said table, means operable to effect relative movement between said table and support in a direction transversely of the reciprocable path of said table upon each movement of said table in said path, reversible power means operable to effect vertical reciprocation of said support to move the same toward and from said table for movement of said grinding wheel into and out of grinding engagement with a work piece on the table, and control means operable in conjunction with said reversible power means to automatically maintain a substantially uniform preselected pressure between said grinding wheel and the work piece.

6. An abrading machine comprising a table having clamping means for clamping a work piece in fixed position thereon, a support mounted above said table for vertical movement toward and from the same, a grinding wheel mount carried by said support and having limited vertical movement relative thereto in a direction toward and from a work piece on said table, a grinding wheel journalled for rotation in said mount, an electric motor operatively connected to said wheel for effecting rotation thereof, means yieldingly urging said wheel mount downwardly relative to said support, means operable to effect horizontal reciprocation of said table, means operable to effect relative movement between said table and support in a direction transversely of the reciprocable path of said table, reversible power means to effect vertical reciprocation of said support to move said grinding wheel into and out of grinding engagement with a work piece clamped on said table, and means operable to control said power means to maintain a substantially uniform preselected pressure between said grinding wheel and the work piece.

7. A billet grinder comprising a table having clamping means for clamping a billet in fixed position thereon, means operable to effect reciprocation of said table in a direction lengthwise of the billet, a carriage mounted for horizontal movement toward and from said table in a direction transversely of the billet, a vertically disposed column structure on said carriage, a support slidably mounted on said column structure for vertical movement toward and from the plane of said table, a grinding mount carried by said support above said table, said grinding mount including an arbor journalled for rotation about a horizontal axis, a grinding wheel mounted on said arbor and a motor operatively connected to said arbor for effecting rotation thereof, said mount having limited pivotal movement relative to said support about a horizontal axis toward and from said table, reversible power means operable to effect vertical reciprocation of said support, and control means operable in conjunction with said reversible power means to automatically maintain a substantially uniform preselected pressure between said grinding wheel and the work piece.

8. A billet grinder, as set forth in claim 7, wherein said control means includes means adjustable for varying said preselected pressure.

References Cited in the file of this patent

UNITED STATES PATENTS

| | | |
|---|---|---|
| 2,127,877 | Maglott | Aug. 23, 1938 |
| 2,168,596 | Hall | Aug. 8, 1939 |
| 2,278,584 | Peterson | Apr. 7, 1942 |
| 2,290,611 | Hite | July 21, 1942 |
| 2,396,775 | De Young | Mar. 19, 1946 |
| 2,651,895 | Rocks | Sept. 15, 1953 |
| 2,802,312 | Gosney et al. | Aug. 13, 1957 |
| 2,961,808 | Dunigan | Nov. 29, 1960 |